(12) United States Patent
Ima

(10) Patent No.: US 6,679,778 B2
(45) Date of Patent: Jan. 20, 2004

(54) TORQUE LIMITER FOR WHEEL DRIVING FORCE

(75) Inventor: Akihiro Ima, Osaka-fu (JP)

(73) Assignee: Kanzaki Kokyukoki Mfg. Co., Ltd., Hyogo-ken (JP)

( * ) Notice: Subject to any disclaimer, the term of this patent is extended or adjusted under 35 U.S.C. 154(b) by 0 days.

(21) Appl. No.: 09/411,801

(22) Filed: Oct. 1, 1999

(65) Prior Publication Data

US 2003/0153388 A1 Aug. 14, 2003

(30) Foreign Application Priority Data

Oct. 2, 1998 (JP) .......................................... 10-280960

(51) Int. Cl.[7] ................................................ F16C 1/24
(52) U.S. Cl. ........................ 464/10; 464/7; 192/113.34
(58) Field of Search .............................. 464/45, 46, 47, 464/48, 10, 7, 182, 183; 192/103 F, 58.41, 113.34

(56) References Cited

U.S. PATENT DOCUMENTS

| 2,127,768 A | * | 8/1938 | Debrie | 464/45 |
| 2,977,779 A | | 1/1961 | Steinke et al. | |
| 3,277,671 A | * | 10/1966 | Winstone et al. | 464/46 |
| 4,624,650 A | * | 11/1986 | Hiruma et al. | 192/70.12 |
| 4,651,847 A | | 3/1987 | Hermanns | |
| 4,976,129 A | * | 12/1990 | Setzer et al. | 464/182 |
| 5,980,225 A | * | 11/1999 | Sommer | 464/182 |

* cited by examiner

Primary Examiner—Lynne H. Browne
Assistant Examiner—Aaron Dunwoody
(74) Attorney, Agent, or Firm—Knobbe, Martens, Olson & Bear LLP

(57) ABSTRACT

A torque limiting apparatus includes: a connecting shaft (20), the output side of which is connected to a differential gear system (60), and the input side of which is protruded out of an opening (80b) formed at the housing (80) of the differential gear system; a hollow cylindrical casing (10) supported on the input side of the connecting shaft rotatably relative thereto, and connectable to the drive shaft; a seal member (14) for interconnecting liquid-tightly an opening at the output side of the casing and an opening of the housing, and a connecting mechanism (30) provided between the casing and the connecting shaft, for transmitting only a partial power less than a predetermined torque value out of whole power input into the casing, so that a lubricating oil can be automatically supplied.

9 Claims, 4 Drawing Sheets

TORQUE LIMITER FOR WHEEL DRIVING FORCE

DETAILED DESCRIPTION OF THE INVENTION

1. Technical Field of the Invention

The present invention relates to a torque limiting apparatus provided in a path of power transmission from a drive source to a drive shaft for vehicles such as trucks.

2. Prior Art

For power transmission from a drive source to a drive shaft for vehicles such as trucks, a conventional structure of gearing system generally used is described with an example of a front-wheel drive vehicle. This well known structure of gearing system is arranged along the longitudinal direction of the vehicle, and so configured that the rear end of the drive shaft is connected to the drive source, and the front end thereof is connected to a differential gear system. A connection between the drive shaft and the differential gear system has been performed by the direct engagement of an output gear mounted at the front end of the drive shaft nonrotatably relative thereto, with the input gear of the differential gear system.

Such a well known structure of gearing system is simple, but there are following disadvantages due to the direct engagement of the drive shaft and the input gear of the differential gear system.

It is desirable that parts configuring vehicles are each made compact for a reduction in cost of vehicles and an improvement in steerability of driving vehicles. On the other hand, it is required for each part to be strong enough to bear a required load. Thus, each part for vehicles are sized as small as possible when a required strength is satisfied for each part. For example, assuming that the dimension of a connection part between the drive shaft and differential gear system is determined, based on a load imposed on said connection portion (hereafter, referred to as a load on a normal driving state) when driving on a terrain with a relatively flat surface. In this case, assuming that drive wheels had an impact load momentary caused by a sudden start or stop of a vehicle, a sudden load (hereafter, referred as a peak load) in excess of the load on a normal driving state, would be imposed on the connection part, thereby the part could be damaged. Consequently, for the well known structure of gearing system, it is required for the connection part between the drive shaft and the input gear of the differential gear system to be large enough to bear the peak load, so the requirement for making a reduction in size can not be sufficiently satisfied.

On the other hand, U.S. Pat. No. 2,977,779 discloses a structure of gearing system in which, as shown in FIG. 4, the front end of a drive shaft, its rear end being connected to a drive source (not shown), and the rear end of a connecting shaft 120, its front end being connected to an input gear of differential gear system (not shown), are connected to each other via a torque limiting apparatus 100. As shown in the figure, the torque limiting apparatus 100 comprises a middle shaft 101 connected via a universal joint 130 to the front end of the drive shaft nonrotatably relative thereto around its axis, drive friction discs 102 mounted on the middle shaft nonrotatably relative thereto, a cylindrical casing 103, which has a closed front end, surrounding the middle shaft 101 and drive friction discs 102, driven friction discs 104 mounted on the inner periphery of the casing 103 nonrotatably relative thereto and bringing into a frictional contact with the drive friction discs 102, and a biasing member 105 for biasing the drive friction discs 102 and driven friction discs 104 in a manner one side is pressed toward the other. A connection between the connecting shaft 120 and the torque limiting apparatus 100, is made by the rear end of the connecting shaft 120 connected to the front end of the casing 103 nonroratably relative thereto.

The torque limiting apparatus 100, allows a power transmission from the drive friction discs 102 to the driven friction discs 104 by means of a frictional contact on a normal driving state, while, in case of having a peak load as mentioned above, the drive friction discs 102 and the driven friction discs 104 slip to each other, thus the power transmission therebetween is cut off. The use of such torque limiting apparatus 100 allows the strength for the connecting part between the connecting shaft 120 and the input shaft of the differential gear system to be determined in accordance with the load on a normal driving state as mentioned above. Namely, the power transmission from the drive source to the differential gear system is cut off upon peak loads, so there is no need for the connecting part between the connecting shaft and differential gear system to be large sized so as to bear against the peak load. In this manner, the dimension of each part can be determined in accordance with the load on a normal driving state, thereby allowing each component to be downsized.

However, the torque limiting apparatus disclosed in the U.S. Pat. No. 2,977,779 mentioned above, requires a lubricating oil for the frictional discs 102, 104, to be enclosed in advance in the casing 103. In addition, the oil enclosed in the casing 103 is not positively cooled down, so there is another problem in that the heat generated by the frictional discs 102, 104 could cause a deterioration in durability and abrasion resistance.

SUMMARY OF THE INVENTION

An object of the present invention, which has been accomplished to overcome the foregoing problems, is to provide a torque limiting apparatus for transmitting power from an output end of a drive shaft, the input end of which is connected to a drive source, to a differential gear system for driving a pair of drive wheel axes, the apparatus being adapted to supply a lubricating oil automatically thereinto.

To fulfill the foregoing object, the present invention provides a torque limiting apparatus for transmitting power from a drive shaft connected to a drive source, to a differential gear system for driving a pair of wheel axes, the apparatus comprising: a connecting shaft, an output side of which is connected to the differential gear system, an input side of which is protruded out of an opening formed at a housing of the differential gear system; a hollow cylindrical casing supported on the input side of the connecting shaft rotatably relative thereto, and connectable to the connecting shaft; a seal member for liquid-tightly connecting the output opening of the casing and the opening of the housing; and a connecting mechanism provided between the casing and the connecting shaft, for transmitting only a partial power less than a predetermined torque value out of whole power input into the casing, to the connecting shaft.

Preferably, the apparatus can be further provided with a mount flange which closes liquid-tightly the input opening of the casing and is connected to the drive shaft.

More preferably, the apparatus can be so constructed that the flange has a center bore formed in communication with both the inside and outside of the casing, the connecting shaft comprising: a supporting shaft, an output end of which is connected to the differential gear system, and an input end of which is protruded liquid-tightly out of the center bore of the flange, a middle shaft supported on the supporting shaft nonrotatably relative thereto and axially movable, an input end of the middle shaft being protruded liquid-tightly out of the center bore of the flange, the connecting mechanism can be provided between the middle shaft and the casing, and a locking member can be provided in the housing for positioning the output end of the middle shaft, and a locking device removably fixed to the input end of the supporting shaft, so that the axial movement of the middle shaft can be prevented in cooperation with the locking member.

Preferably, the connecting mechanism can be so constructed that drive frictional discs provided onto the inner periphery of the casing nonrotatably relative thereto, and driven frictional discs provided onto the outer periphery nonrotatably relative thereto, corresponding to the drive frictional discs, and adapted to be brought into a frictional contact with the drive frictional discs, and a biasing member arranged in the casing so that the drive and driven frictional discs are biased in a manner one side is pressed toward the other at a predetermined bias force.

More preferably, the connecting mechanism can be further provided with a adjustment member for adjusting the bias force of the biasing member.

As explained above, the torque limiting apparatus embodying the invention comprises a connecting shaft, its output side being connected to a differential gear system, its input side being protruded out of an opening formed at a housing of the differential gear system; a hollow cylindrical casing supported on the input side of the connecting shaft rotatably relative thereto, and adapted to be connectable with respect to the connecting shaft; a seal member for liquid-tightly connecting the output opening of the casing and the opening of the housing; and a connecting mechanism provided between the casing and the connecting shaft, for transmitting only a partial power less than a predetermined torque value out of whole power input into the casing, to the connecting shaft, so that a lubricating oil to be supplied to the differential gear system can be automatically supplied to the connecting mechanism through a gap formed between the connecting shaft and the casing. In addition, the oil supplied to the mechanism can be also circulated to the differential gear system through the gap. Consequently, a heat generation caused by the connecting mechanism can be effectively reduced, thereby allowing an improvement in durability and abrasion resistance.

The apparatus can be further provided with a mount flange which closes liquid-tightly the input opening of the casing, and is connected to the drive shaft, so as to prevent a lubricating oil supplied into the connecting mechanism from leaking out.

Further, the apparatus can be so constructed that a center bore is formed at the flange, the connecting shaft is adapted to be a double structure having a supporting shaft connected to the differential gear system, and a middle shaft supported on the supporting shaft nonrotatably relative thereto and axially movable, both input ends of the supporting shaft and middle shaft are protruded liquid-tightly out of the center bore, the connecting mechanism can be provided between the middle shaft and the casing, and the middle shaft is fixed axially nonmovable by a locking member provided in the housing and a locking device removably fixed on the input end of the supporting shaft, so that the casing, the flange, the middle shaft and the connecting mechanism can be all assembled in one unit in advance, thereby after the differential gear system is attached, the assembly unit can be separately incorporated into the apparatus. Thus, typical assembly works for incorporating the connecting mechanism into the casing, made in a limited space, can be eliminated, thereby allowing an improvement in efficiency of assembly works.

Further, the torque limiting apparatus can be so constructed that the connecting mechanism comprises drive frictional discs adapted to be nonrotatably relative to the casing, driven frictional discs adapted to be nonrotatably relative to the drive discs, and a biasing member for biasing the drive and driven discs in a manner one side is pressed toward the other, and that an adjustment member for adjusting a bias force of the biasing member, is further provided, and then an adjustment of the maximum torque value transmitted from the casing to the connecting shaft, can be achieved.

Alternatively, the torque limiting apparatus transmitting power from a drive shaft connected to a drive source, to a differential gear system for driving a pair of wheel axes may comprise:

a connecting shaft, the output side of which is connected to the differential gear system, the input side of which is protruded out of an opening formed at the housing of the differential gear system; a hollow cylindrical casing supported on the input side of the connecting shaft rotatably relative thereto, and a mount flange connected at the input end to the drive shaft; and a connecting mechanism provided between the inner periphery of the casing and the outer periphery the connecting shaft, for transmitting only a partial power less than a predetermined torque value out of whole power input into the casing, to the connecting shaft.

The invention will be further clarified by the description of embodiments with reference to the following accompanying drawings. The invention is not limited to these embodiments, but various modifications are possible without deviation from the scope of the claims.

PREFERRED EMBODIMENT OF THE INVENTION

Figure 1:
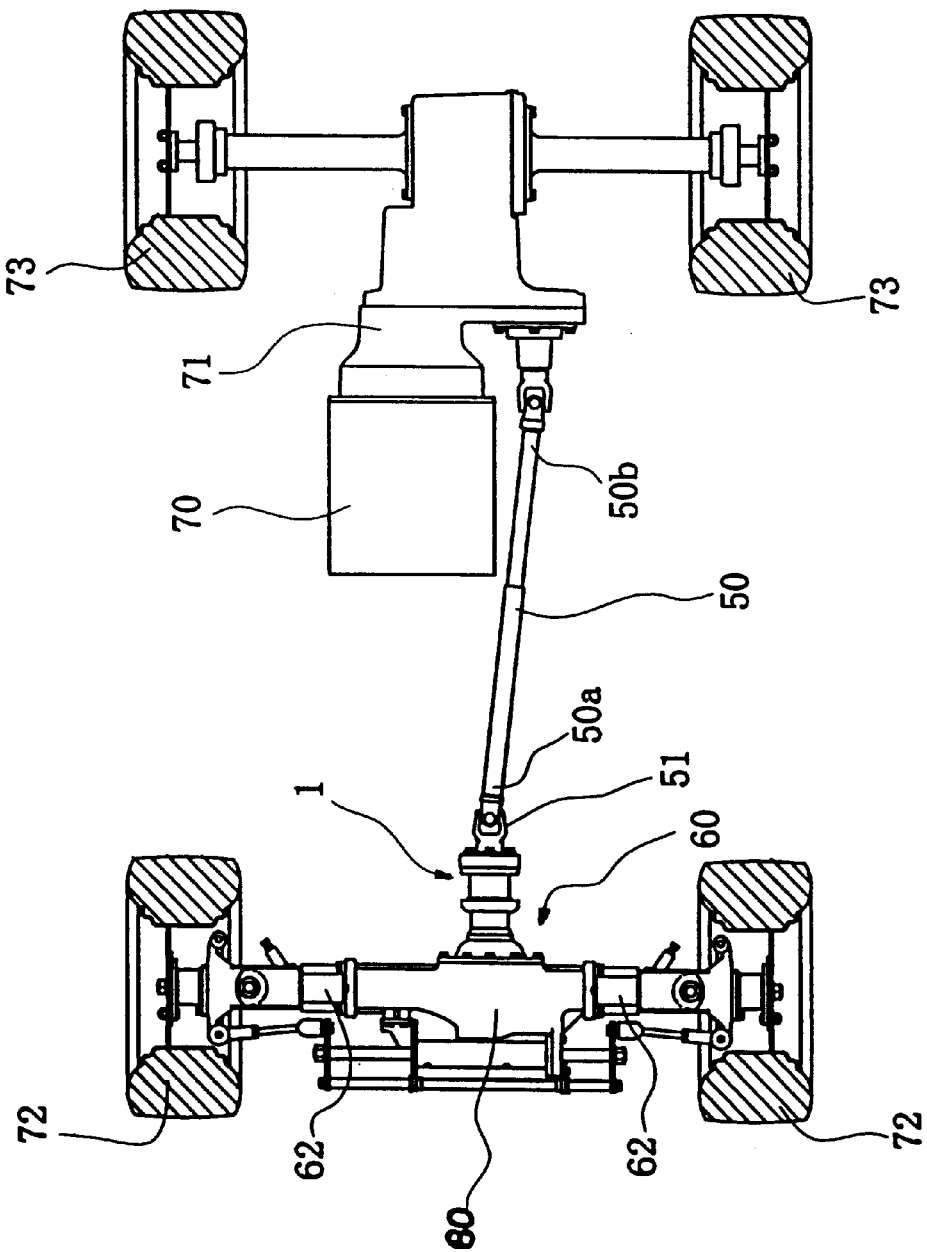
FIG. 1 is a plan view of a vehicle comprising a preferred embodiment of the torque limiting apparatus of the invention.

A preferred embodiment of a torque limiting apparatus of the present invention will be described below with reference to the drawings. FIG. 1 is a plan view of a vehicle comprising a preferred embodiment of the torque limiting apparatus 1 of the invention, FIG. 2 is a cross sectional view showing the torque limiting apparatus 1, and FIG. 3 is a view enlarged at part A of FIG. 2.

The torque limiting apparatus 1 is adapted for use in vehicles with driving front wheels 72, 72, wherein power is delivered from an output end 50a of a drive shaft 50, to a differential gear system 60 for driving a pair of front axes 62, 62 serving as drive axes, the input end 50b of the drive shaft 50 being connected to a drive source 70, via the transmission 71, as shown in FIG. 1. In FIG. 1, the rear wheels are denoted with reference number 73, and the housing of the differential gear system is denoted with 80. The housing 80 consists of a first part 81 and a second part 82 removable from the first part 81, for installation of the differential gear system 60 (refer to FIGS. 2 and 3).

Figure 2:
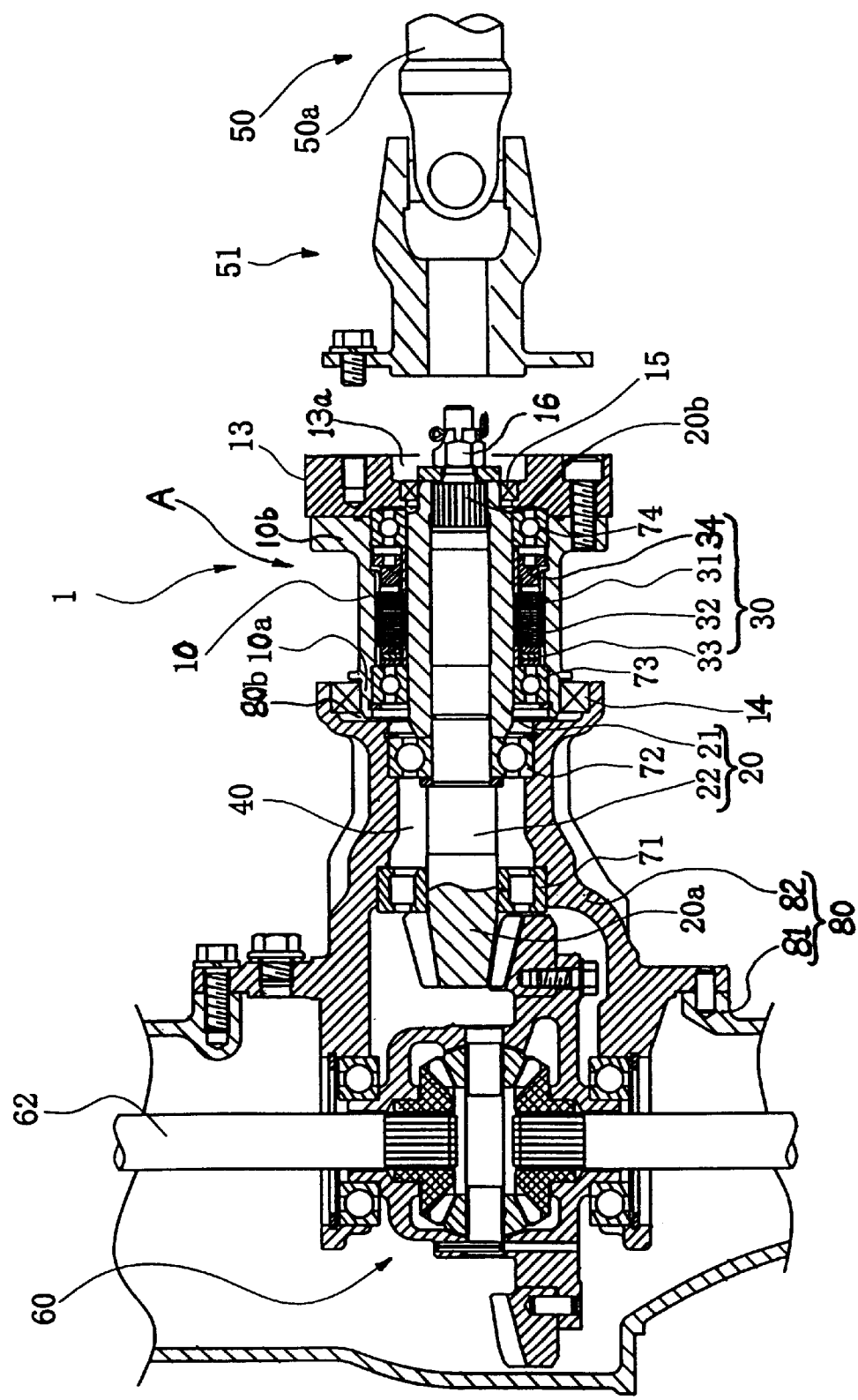
FIG. 2 is a cross sectional view showing the torque limiting apparatus of FIG. 1.
Figure 3:
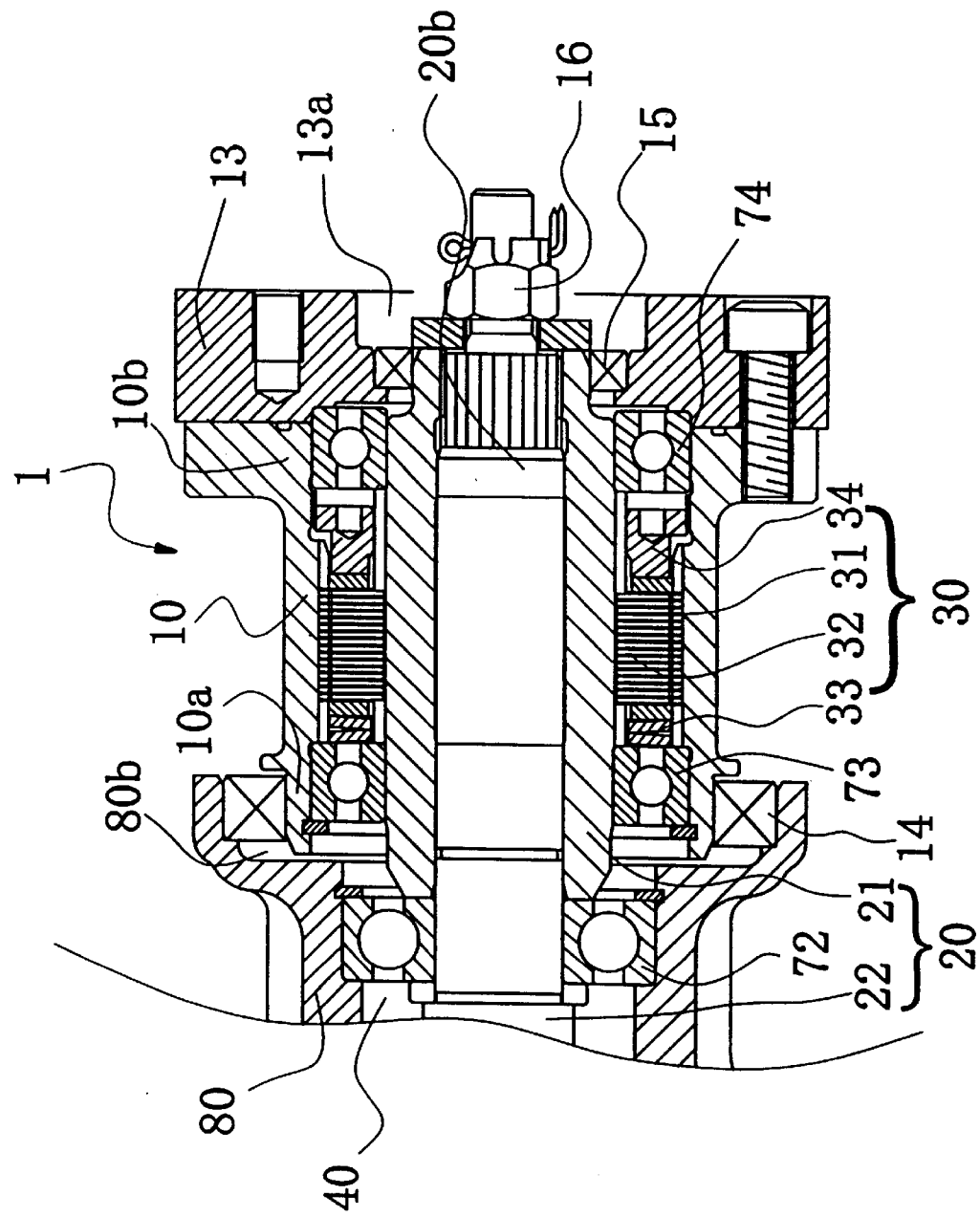
FIG. 3 is a view enlarged at part A of FIG. 2.
Figure 4:
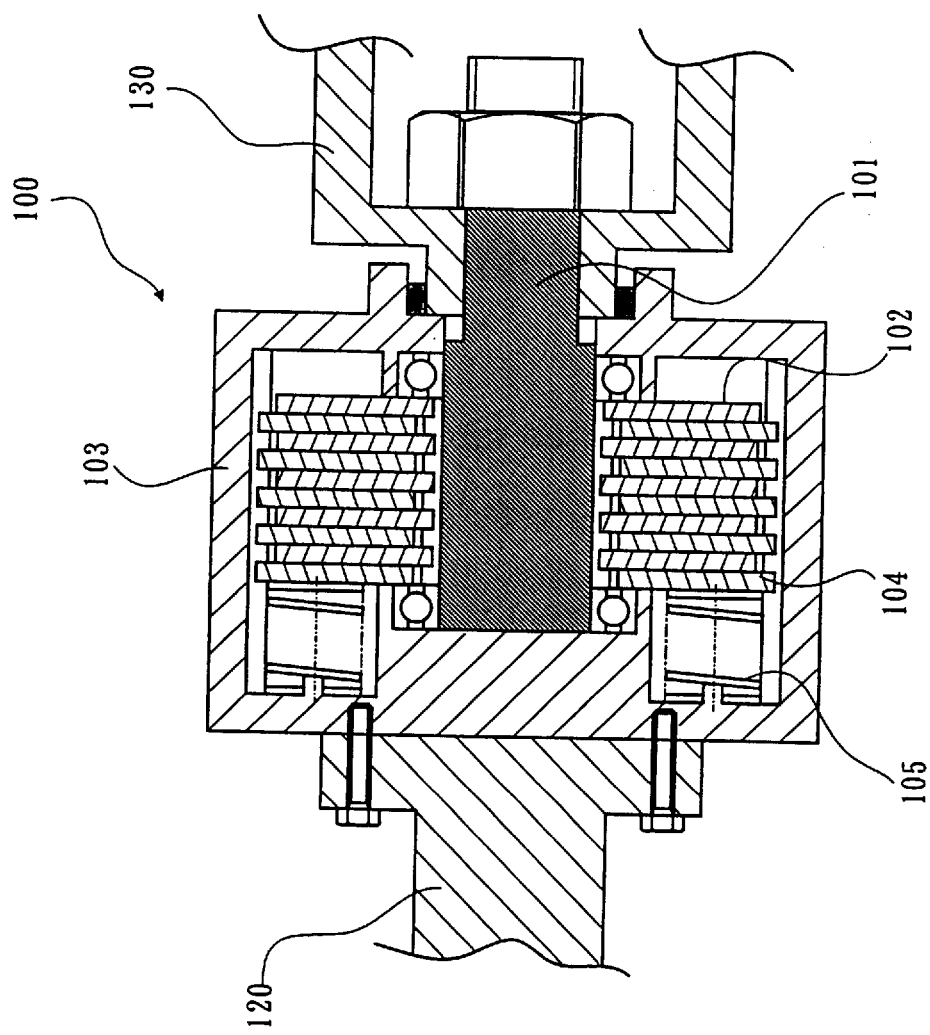
FIG. 4 is a cross sectional view of a conventional torque limiting apparatus.

The torque limiting apparatus 1, as best shown in FIG. 2, comprises a connecting shaft 20, the output part 20a of which is intruded into the housing 80 of the differential gear system to connect to the differential gear system 60, and the input part 20b of which is protruded out of the opening 80b of the housing 80, and a hollow cylindrical casing 10 supported on the input part 20b of the connecting shaft rotatably relative thereto, and connectable to the output end 50a of the drive shaft 50. The preferred embodiment of the torque limiting apparatus 1 is adapted for use in front wheel drive vehicles as described above, so input and output for each component, correspond to rear and front, respectively, for each part with respect to the longitudinal directions of a vehicle.

The front end 10a of the casing 10 is connected to the housing 80 of the differential gear system liquid-tightly and rotatably relative thereto. Namely, an opening of the front end 10a and an opening 80b of the housing 80 are liquid-tightly connected each other, and the casing 10 is adapted to be freely rotated about the axial line. According to the preferred embodiment of the present invention, the front end 10a is intruded into the opening 80b of the housing, and a seal bearing 14 is inserted between the outer periphery of the casing front end 10a and the inner periphery of the housing, in such a manner a liquid-tightness therebetween is maintained while allowing the casing 10 to be freely rotated.

On the other hand, an opening at the rear end 10b of the casing 10, is liquid-tightly closed by the mount flange 13. The flange 13, as best shown in FIGS. 2 and 3, is connected to the drive shaft 50 nonrotatably relative thereto about the axial line, via a universal joint 51. An appropriate number of drive frictional discs 31 extending radially inwardly are provided on the inner periphery of the casing 10 nonrotatably relative thereto.

The connecting shaft 20 is adapted to be a double structure having a supporting shaft 22, the front end of which is connected to the differential gear system 60, and the rear end of which is protruded out of the center bore 13a of the mount flange toward a rear direction, and a middle shaft 21 supported on the supporting shaft 22 nonrotatably relative thereto and axially movable, the rear end of the middle shaft being protruded out of the center bore 13a toward a rear direction. The rear ends of the supporting shaft 22 and the middle shaft 21, and the center bore 13a are adapted to be liquid-tight by the seal member 15 such as seal bearing or the like.

The supporting shaft 22 is supported on the bearings 71, 72, provided in the housing 80, and the front end of the shaft 22 is connected to the differential gear system 60. The rear end of the supporting shaft 22, has a locking device 16 screwed thereon, and the device 16 can be tightened from the outside.

The middle shaft 21 is encased in the casing 10 rotatably relative thereto, via bearings 73, 74. The middle shaft 21 is prevented from moving forward by the bearing 72 provided in the housing 80, and from moving backward by the locking device 16 screwed on the rear end of the supporting shaft 22. Namely, the bearing 72 also serves as a locking member to prevent the middel shaft 21 from moving forward, and the middle shaft 21 is fixed at its axial position by the bearing 72 and the locking device 16.

The appropriate number of driven frictional discs 32 extending radially outwardly is provided on the outer periphery of the middle shaft 21 nonrotatably relative thereto. The driven frictional discs 32 are arranged in position so as to engage with the drive frictional discs 31.

In the casing 10, a biasing member 33 is arranged so as to bias the drive frictional discs 31 and driven frictional discs 32 in a manner one side is pressed toward the other. According to the preferred embodiment of the present invention, a coned disc spring is used as the biasing member 33. The axial movement of the biasing member 33 is prevented by the bearing 73.

The connecting mechanism 30 for transmitting only a partial power less than a predetermined torque value out of whole power input into the casing 10, to the connecting shaft 20, consists of the drive frictional discs 31, the driven frictional discs 32 and the biasing member 33. The connecting mechanism 30 is adapted to be in a state in communication with the differential gear system 60, by a gap 40 between the inner periphery of the housing 60 and casing 10, and the outer periphery of the connecting shaft 20.

According to the embodiment of the present invention, the connecting mechanism 30 includes an adjustment member 34 provided for adjusting the bias force of the biasing member 33, thereby a predetermined torque value delivered from the casing 10 to the connecting shaft 20, can be arbitrarily set.

Namely, the torque transmission from the drive frictional members 31 to the driven frictional members 32, can be performed by means of a frictional force between both members, while the frictional force increases in proportion to the bias force of the biasing member 33. Then, the bias force of the biasing member 33 increases in proportion to the extent of deformation of the compressed member. Therefore, when the biasing member 33 is more compressed by the adjustment member 34, an upper limit torque value delivered from the drive frictional members 31 to the driven frictional members 32, can be raised higher. On the contrary, when the member 33 is less compressed, the value can be made lower. According to the embodiment of the present invention, a ring-like screw member having a screwed outer periphery, is used as the adjustment member 34, while a screwed inner periphery of the casing 10 is provided to engage with the ring-like screw member.

According to the torque limiting apparatus 1 so constructed, in addition to the effects as described above, the following effects can be obtained. Namely, the connecting mechanism 30 is so arranged that, in the event of sudden start or stop of a vehicle, the front drive wheels have a load in excess of the transmission torque capacity of the connecting mechanism 30, thereby when the rotation speed of the front wheels is suddenly decreased or increased, the drive frictional discs 31 and the driven frictional discs 32 slip to each other, so as to cut off the power transmission from the drive source to the differential gear system. Consequently, there is no need for the connecting parts between the connecting shaft and differential gear system to be formed larger in size any longer, in accordance with a peak load caused momentary by a sudden change in rotation speed for the front wheels. Thus, components for power transmission path from the drive source to the drive shaft, can be designed in accordance with the load on a normal driving state, thereby allowing each component to be formed more compact in size.

According to the embodiment of the invention, the connecting mechanism 30 is adapted to be in communication with the differential gear system 60 via the gap 40, so the lubricating oil supplied to the differential gear system 60, can be automatically supplied to the connecting mechanism 30 via the gap 40. The lubricating oil supplied to the mechanism 30, can be also circulated into the differential gear system or the like via the gap 40. Consequently, the heat generation of the mechanism 30 can be effectively reduced, thereby allowing an improvement in abrasion resistance and durability.

According to the embodiment of the invention, the casing 10 is structured liquid-tightly, and the casing 10 and the housing 80 for the differential gear system are also liquid-tightly connected, so the lubricating oil supplied to the mechanism 30 may not leak out during traveling of a vehicle. This is the most important effect, especially when the torque limiting apparatus is used for vehicles adapted to travel on lawns like lawn mowers.

(1) The connecting shaft 20 is adapted to be a double structure having a supporting shaft 22 connected to the differential gear system 60, and a middle shaft 21 supported on said supporting shaft 22 nonrotatably relative thereto and axially movable, (2) the connecting mechanism 30 is provided between the middle shaft 21 and the casing 10 encasing the middle shaft 21, (3) the rear ends of the supporting shaft 22 and the middle shaft 21 are protruded liquid-tightly out of the center bore 13a of the mount flange 13, and (4) by means of the bearing 72 serving as a locking member provided in the housing 80, and the locking device 16 removably fixed on the rear end of the supporting shaft 22, the axial movement of the middle shaft 21 is prevented, so that the casing 10, the flange 13, the middle shaft 21 and the connecting mechanism 30 can be all assembled in a unit in advance, thereby after the differential gear system 60 is attached to the vehicle, the unit can be separately incorporated into the vehicle. Namely, after the differential gear system 60 is attached to the vehicle, the supporting shaft 22 is supported on the bearings 71, 72 provided in the housing 80 and connected to the differential gear system 60, after that, the assembly unit is mounted onto the supporting shaft 22 from the rear direction of the shaft 22, then fixed by the locking device 16 to complete the whole assembly. Thus, typical assembly works for incorporating the connecting mechanism 30 into the casing to be made in a limited space, can be eliminated, thereby allowing an improvement in efficiency of assembly works.

Although the present embodiment has been described with reference to a vehicle wherein the front wheels are drive wheels, the invention is not limited to such vehicles but is of course applicable also to vehicles wherein the rear wheels are drive wheels. In this case, input side and output side of each component correspond to rear and front, respectively, with respect to the longitudinal directions of a vehicle.

What is claimed is:

1. A torque limiting apparatus for transmitting power from a drive shaft connected to a drive source, to a differential gear system for driving a pair of wheel axes, the torque limiting apparatus comprising:
   a connecting shaft having an input side and an output side, said output side being adapted to be connected to the differential gear system,
   a hollow cylindrical casing having an interior and supported on the input side of the connecting shaft rotatably relative thereto, said hollow cylindrical casing having an input end and an output end, said input end of the casing being adapted to be connected to the drive shaft, said output end of the casing having an opening communicating with the interior of the casing,
   a seal member for interconnecting liquid-tightly the opening of the casing and an opening of a housing of the differential gear system, wherein the interior of the casing and an interior of the housing communicate with each other through the opening of the casing and the opening of the housing, and
   a connecting mechanism, provided between the casing and the connecting shaft, for transmitting only a partial power less than a predetermined torque value out of whole power input into the casing.

2. A torque limiting apparatus according to claim 1, further comprising a mount flange closing liquid-tightly an opening at the input end of the casing, and connected to the drive shaft.

3. A torque limiting apparatus for transmitting power from a drive shaft connected to a drive source, to a differential gear system for driving a pair of wheel axes, the torque limiting apparatus comprising:
   a connecting shaft having an input side and an output side, said output side being adapted to be connected to the differential gear system;
   a hollow cylindrical casing having an interior and supported on the input side of the connecting shaft rotatably relative thereto, said hollow cylindrical casing having an input side and an output side, said input side of the casing being adapted to be connected to the drive shaft, said output side of the casing having an opening communicating with the interior of the casing;
   a seal member for interconnecting liquid-tightly the opening of the casing and an opening of a housing of the differential gear system, wherein the interior of the casing and an interior of the housing communicate with each other through the opening of the casing and the opening of the housing;
   a connecting mechanism, provided between the casing and the connecting shaft, for transmitting only a partial power less than a predetermined torque value out of whole power input into the casing; and
   a mount flange closing liquid-tightly an opening at the input side of the casing, and connected to the drive shaft,
   wherein the mount flange has a center bore adapted to be in communication with the inside and outside of the casing, the connecting shaft having: a supporting shaft, the output end of which is connected to the differential gear system, and the input end of which is protruded liquid-tightly out of the center bore of the flange; and a middle shaft which is supported on the supporting shaft nonrotatably relative thereto and axially movable, and the input end of which is protruded liquid-tightly out of the center bore of the flange,
   the connecting mechanism being provided between the middle shaft and the casing, and
   further comprising: a locking member in the housing, for positioning the output end of the middle shaft, and a locking device removably fixed to the input end of the supporting shat, and preventing the middle shaft form axial movement in cooperating with the locking member.

4. A torque limiting apparatus for transmitting power from a drive shaft connected to a drive source, to a differential gear system for driving a pair of wheel axes, the torque limiting apparatus comprising:
   a connecting shaft having an input side and an output side, said output side being adapted to be connected to the differential gear system;

a hollow cylindrical casing having an interior and supported on the input side of the connecting shaft rotatably relative thereto, said hollow cylindrical casing having an input side and an output side, said input side of the casing being adapted to be connected to the drive shaft, said output side of the casing having an opening communicating with the interior of the casing;

a seal member for interconnecting liquid-tightly the opening of the casing and an opening of a housing of the differential gear system, wherein the interior of the casing and an interior of the housing communicate with each other through the opening of the casing and the opening of the housing; and a connecting mechanism, provided between the casing and the connecting shaft, for transmitting only a partial power less than a predetermined torque value out of whole power input into the casing, wherein the connecting mechanism comprises:
  drive frictional discs provided on the inner periphery of the casing nonrotatably relative thereto,
  driven frictional discs provided, correspondingly to the drive discs, on the outer periphery of the connecting shaft nonrotatably relative thereto, and adapted to be brought into a frictional contact with the drive frictional discs,
  a biasing member encased in the casing, and biasing at a predetermined bias force the drive and driven frictional discs in a manner one side is pressed toward other.

5. A torque limiting apparatus according to claim 4, wherein the connecting mechanism further comprises an adjustment member for adjusting the adjustment force of the biasing member.

6. A torque limiting apparatus according to claim 4, further comprising a mount flange closing liquid-tightly an opening at the input side of the casing, and connected to the drive shaft.

7. A torque limiting apparatus according to claim 6, wherein the mount flange has a center bore adapted to be in communication with the inside and outside of the casing, the connecting shaft having: a supporting shaft, the output end of which is connected to the differential gear system, and the input end of which is protruded liquid-tightly out of the center bore of the flange; and a middle shaft which is supported on the supporting shaft nonrotatably relative thereto and axially movable, and the input end of which is protruded liquid-tightly out of the center bore of the flange, the connecting mechanism being provided between the middle shaft and the casing, and further comprising: a locking member in the housing, for positioning the output end of the middle shaft, and a locking device removably fixed to the input end of the supporting shat, and preventing the middle shaft form axial movement in cooperating with the locking member.

8. A toque limiting apparatus according to claim 7, wherein the connecting mechanism further comprises an adjustment member for adjusting the adjustment force of the biasing member.

9. A toque limiting apparatus according to claim 6, wherein the connecting mechanism further comprises an adjustment member for adjusting the adjustment force of the biasing member.

* * * * *

UNITED STATES PATENT AND TRADEMARK OFFICE
CERTIFICATE OF CORRECTION

PATENT NO.   : 6,679,778 B2
DATED        : January 20, 2004
INVENTOR(S)  : Akihiro Ima It is certified that error appears in the above-identified patent and that said Letters Patent is hereby corrected as shown below:

<u>Title page,</u>
Item [54], Title, should read -- TORQUE LIMITER FOR WHEEL DRIVING DEVICE --

Signed and Sealed this

Thirteenth Day of July, 2004

JON W. DUDAS
*Acting Director of the United States Patent and Trademark Office*